(12) United States Patent
Zhou et al.

(10) Patent No.: US 11,873,878 B2
(45) Date of Patent: Jan. 16, 2024

(54) NOISE VIBRATION HARSHNESS REDUCTION ASSEMBLY AND METHODS, AN AXIAL RING CONFIGURED TO ATTENUATE SOUND INDUCING VIBRATIONS

(71) Applicant: GM GLOBAL TECHNOLOGY OPERATIONS LLC, Detroit, MI (US)

(72) Inventors: Sen J. Zhou, Troy, MI (US); Pavan Kumar Patruni, Karnatka (IN); Venu G. Ganti, Troy, MI (US); Craig D. Reynolds, Davisburg, MI (US); Dhanasekar Baladhandapani, Bangalore (IN); Hung-Yih I. Du, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 344 days.

(21) Appl. No.: 17/367,858

(22) Filed: Jul. 6, 2021

(65) Prior Publication Data

US 2023/0012162 A1    Jan. 12, 2023

(51) Int. Cl.
*F16F 15/12* (2006.01)
*F16H 57/028* (2012.01)

(52) U.S. Cl.
CPC ....... *F16F 15/1201* (2013.01); *F16H 57/028* (2013.01); *F16F 2232/02* (2013.01); *F16F 2236/04* (2013.01)

(58) Field of Classification Search
CPC ...................................... F16C 25/08
See application file for complete search history.

(56) References Cited

U.S. PATENT DOCUMENTS

| | | | | |
|---|---|---|---|---|
| 2,188,251 A | * | 1/1940 | Nelson | B23Q 1/265 384/519 |
| 9,509,191 B2 | * | 11/2016 | Yamaguchi | F16C 33/78 |
| 2014/0029884 A1 | * | 1/2014 | Toyama | F16F 1/328 384/490 |
| 2018/0003293 A1 | * | 1/2018 | Figura et al. | |

FOREIGN PATENT DOCUMENTS

| | | | | |
|---|---|---|---|---|
| CN | 101737445 A | * | 6/2010 | ......... F16D 25/0638 |
| DE | 102010029304 A1 | * | 12/2010 | ............. F16F 1/324 |

* cited by examiner

*Primary Examiner* — Melanie Torres Williams
(74) *Attorney, Agent, or Firm* — Quinn IP Law (57) ABSTRACT

A noise vibration harshness reduction assembly includes a housing, a component, and an axial ring. The component is supported via the housing and movable relative to the housing. The axial ring is disposed axially along the component. The axial ring is configured to attenuate axial sound inducing vibrations in response to operation of the component.

20 Claims, 6 Drawing Sheets

NOISE VIBRATION HARSHNESS REDUCTION ASSEMBLY AND METHODS, AN AXIAL RING CONFIGURED TO ATTENUATE SOUND INDUCING VIBRATIONS

CROSS-REFERENCE TO RELATED APPLICATIONS

This application is related to U.S. application Ser. No. 17/141,594, filed Jan. 5, 2021, which is hereby incorporated by reference in its entirety.

INTRODUCTION

Vehicles include many components that are rotatable during operation. These rotating components may produce noise during operation. This noise may be heard by an occupant of the vehicle.

SUMMARY

The present disclosure provides a noise vibration harshness reduction assembly that includes a housing and a component supported via the housing. The component is movable relative to the housing. The noise vibration harshness reduction assembly also includes an axial ring. The axial ring is disposed axially along the component. The axial ring is configured to attenuate axial sound inducing vibrations in response to operation of the component.

In certain aspects, the component is rotatable about a central axis and the axial ring continuously surrounds the central axis. Furthermore, in certain configurations, the axial ring is disposed axially between the component and the housing relative to the central axis. Optionally, a snap ring engages the axial ring and the housing to retain the axial ring relative to the component.

In other aspects, the axial ring includes an axial body that extends outwardly to a first axial distal edge and a second axial distal edge that oppose each other. Furthermore, in certain configurations, the first axial distal edge is spaced from the second axial distal edge radially relative to the central axis. In various configurations, the first axial distal edge faces inwardly toward the central axis, and the second axial distal edge faces outwardly away from the central axis.

In certain configurations, the axial body surrounds the central axis. Furthermore, in certain configurations, the axial body extends outwardly radially relative to the central axis to overlap part of the component.

Optionally, the axial ring includes an axial flange that protrudes away from one of the first axial distal edge and the second axial distal edge. In one configuration, the axial flange is piloted to the housing to fix the axial ring to the housing. In another configuration, the axial flange is piloted to the component to fix the axial ring to the component.

In certain aspects, the axial flange further includes a plurality of axial flanges spaced from each other. In various configurations, each of the axial flanges extends from the first axial distal edge inwardly toward the central axis. In other configurations, each of the axial flanges extends from the second axial distal edge away from the axial body.

In other aspects, the axial body of the axial ring includes a plurality of axial corrugations, and in certain configurations, the axial corrugations are disposed between the first axial distal edge and the second axial distal edge. Generally, the axial corrugations engage the axial side of the bearing and the axial wall of the housing to stabilize the bearing when a low load is applied axially to the bearing.

In various aspects, the housing defines a hole along the central axis, and the component includes a bearing disposed in the hole. For example, the axial ring is disposed axially along the bearing relative to the central axis. In certain configurations, the bearing includes a first race fixed to the housing and a second race rotatable relative to the first race about the central axis. In certain aspects, the axial body is disposed axially along the first race relative to the central axis.

Generally, the first race of the bearing includes a radial side that faces away from the central axis and an axial side disposed transverse to the radial side such that the radial side and the axial side are adjacent to each other. Furthermore, generally, the housing includes an axial wall that faces the axial side of the bearing. Optionally, the housing includes a shoulder that extends along the radial side of the bearing and extends along the axial side of the bearing. In certain aspects, the axial ring engages the shoulder when a high load is applied axially to the bearing. In other aspects, axial corrugations engage the axial side of the bearing and the axial wall of the housing to stabilize the bearing when a low load is applied axially to the bearing.

In certain aspects, the axial side of the first race is referred to as a first axial side, and the first axial side disposed transverse to the radial side. Furthermore, generally, the first race of the bearing also includes a second axial side opposing the first axial side and disposed transverse to the radial side. Generally, the axial wall of the housing faces the first axial side of the bearing.

In certain configurations, the axial ring is further defined as a first axial ring disposed axially between the first axial side of the first race and the axial wall of the housing relative to the central axis. Optionally, a second axial ring is disposed axially along the second axial side of the first race relative to the central axis.

The present disclosure also provides an axial ring disposed axially along a component. The axial ring is configured to attenuate axial sound inducing vibrations in response to operation of the component. The axial ring includes an axial body that extends outwardly to a first axial distal edge and a second axial distal edge that oppose each other. The axial ring includes an axial flange that protrudes away from one of the first axial distal edge and the second axial distal edge. The axial body of the axial ring includes a plurality of axial corrugations disposed between the first axial distal edge and the second axial distal edge. The axial body is configured to attenuate axial sound inducing vibrations in response to operation of the component.

The present disclosure further provides a method of utilizing an axial ring and a radial ring to attenuate axial and radial sound inducing vibrations in response to operation of a component inside of a housing. The axial ring is disposed transverse to the radial ring along the component. A torque is selected to be applied to the radial ring. A stiffness of the radial ring is determined based on a stiffness-torque curve utilizing the selected torque to attenuation radial sound in response to operation of the component. A stiffness of the axial ring is determined based on an axial load and selected torque of the radial ring. The radial ring is manufactured that meets the determined stiffness of the radial ring. The axial ring is manufactured that meets the determined stiffness of the axial ring. A profile of the component is manufactured at a torque range higher than the selected torque applied to the radial ring. The axial ring is disposed axially along the component to attenuate axial sound in response to operation of the component.

The detailed description and the drawings or FIGS. are supportive and descriptive of the disclosure, but the claim scope of the disclosure is defined solely by the claims. While some of the best modes and other configurations for carrying out the claims have been described in detail, various alternative designs and configurations exist for practicing the disclosure defined in the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the FIGS. to aid the reader's understanding, and do not represent limitations (for example, to the position, orientation, or use, etc.) on the scope of the disclosure, as defined by the appended claims.

Figure 1:
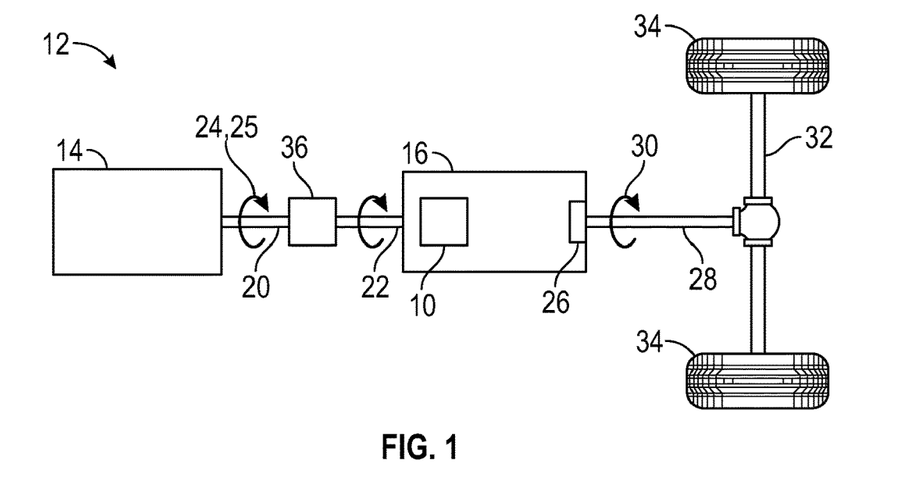
FIG. 1 is a schematic illustration of a movable platform, as one example, to implement a noise vibration harshness reduction assembly.

Referring to the FIGS., wherein like numerals indicate like or corresponding parts throughout the several views, a noise vibration harshness (or sound) reduction assembly 10 is generally shown in FIG. 1 in an example implementation of the noise vibration harshness reduction assembly 10. Generally, the noise vibration harshness reduction assembly 10 may be used to attenuate sound that is produced or generated via moving parts, which will be discussed further below. That is, for example, the noise vibration harshness reduction assembly 10 may be used to attenuate sound inducing vibrations produced or generated via moving parts.

Specifically, as shown in FIG. 1, the noise vibration harshness reduction assembly 10 may be used in a movable platform 12. Non-limiting examples of the movable platform 12 may include a vehicle, a car, a truck, a motorcycle, an off-road vehicle, a farm vehicle, a watercraft, an aircraft, a rail vehicle, or other suitable movable platform 12. Additionally, the vehicle may be a diesel/gas-powered vehicle, a hybrid vehicle, an electric vehicle, etc. It is to be appreciated that alternatively, the noise vibration harshness reduction assembly 10 may be used in a non-vehicle application, such as, farm equipment, stationary platforms, stationary or mobile power plants, robots, conveyors, transport platforms, hard drives, air-conditioning units, etc. For illustrative purposes, the movable platform 12 of FIG. 1 will be described hereinafter in the context of a vehicle without limiting the present teachings to vehicle applications in general.

Continuing with FIG. 1, the vehicle may include a prime mover 14 and a transmission 16 coupled to the prime mover 14. Generally, the prime mover 14 creates power to propel the vehicle, and the transmission 16 provides directional control of the vehicle (such as drive, reverse, park) and also may provide speed and torque conversion of the power from the prime mover 14. The prime mover 14 may have a suitable configuration to create power to propel the vehicle. For example, non-limiting examples of the prime mover 14 may include one or more of an engine, an internal combustion engine, an electric machine, an electric motor, an electric traction motor, etc.

Generally, the transmission 16 is coupled to the prime mover 14 to receive an intermediate torque 25 outputted from the prime mover 14. The transmission 16 and the prime mover 14 may each include a housing 18, with the respective housings of the transmission 16 and the prime mover 14 being rigidly attached to each other. The prime mover 14 may include an output shaft 20, and the transmission 16 may include an input member 22. The output shaft 20 of the prime mover 14 rotates at an engine speed (see arrow 24), and intermediate torque 25 from rotation of the output shaft 20 is transferred to the input member 22 of the transmission 16, which causes the input member 22 to rotate. Non-limiting examples of the transmission 16 may include automatic transmission, dual clutch transmission, automated manual transmission, continuously variable transmission (CVT), etc.

Continuing with FIG. 1, the transmission 16 may include a final drive 26 coupled to the input member 22 and an output member 28 that delivers an output torque (see arrow 30) to one or more drive axles 32 through the final drive 26, and ultimately to a set of wheels 34. Therefore, the intermediate torque 25 from the prime mover 14 is transferred to the transmission 16, and the transmission presents the output torque 30 to drive the wheels 34. It is to be appreciated that the final drive 26 may be driven by an endless rotatable member, and non-limiting examples of the endless rotatable member may include a belt or a chain.

Optionally, the vehicle may include a torque converter 36 (see FIG. 1) operable between the output shaft 20 and the input member 22. For example, the torque converter 36 may be connected to the output shaft 20 of the prime mover 14 and the input member 22 of the transmission 16. As such, the output shaft 20 of the prime mover 14 is rotatable to transfer the intermediate torque 25 in a direction to the input member 22 of the transmission 16 through the torque converter 36. Therefore, the torque converter 36 may provide the desired multiplication of the intermediate torque 25 from the prime mover 14 into the transmission 16 at low speeds.

Generally, the noise vibration harshness reduction assembly 10 may be used to attenuate sound due to sound produced or generated via the moving parts of, for example, the prime mover 14, the transmission 16, a differential, etc. That is, for example, the noise vibration harshness reduction assembly 10 may be used to attenuate sound inducing vibrations produced or generated via moving parts of, for example, the prime mover 14, the transmission 16, the differential, etc. The moving parts may generate noise during operation and this noise may be radiated out to other parts, which may be referred to as structure-borne noise. For example, this noise may be radiated outside the prime mover 14, the transmission 16, the differential, etc., which may then be heard via an occupant of the vehicle, and thus, it is desirable to attenuate this noise. Therefore, the noise vibration harshness reduction assembly 10 is designed to attenuate the sound, such as the noise, generated during operation of the moving parts.

The noise vibration harshness reduction assembly 10 may use an impedance mismatch to reduce the sound heard due to the sound produced or generated via the moving parts. For example, the moving parts may vibrate at one or more frequencies to produce sound that radiates out to other locations. An impedance mismatch is where the noise vibration harshness reduction assembly 10 counters the one or more frequencies produced via the moving parts that reduces the sound heard outside the housing 18 of the moving parts. The impedance mismatch allows the vibration of the moving parts to pass through a radial ring 44 of the noise vibration harshness reduction assembly 10. The radial ring 44 reduces in force and amplitude the sound that is transmitted to the housing 18 (as compared to the sound that would be transmitted to the housing 18 without using the radial ring 44). This sound reduction is achieved by being at a higher level of structural compliance than either of the housing 18 or the vibration of the moving parts. This impedance mismatch provides a degree of isolation between the moving parts and the housing 18. Additional details of the radial ring 44 may be found in U.S. application Ser. No. 17/141,594, filed Jan. 5, 2021, which is hereby incorporated by reference in its entirety.

Figure 2:
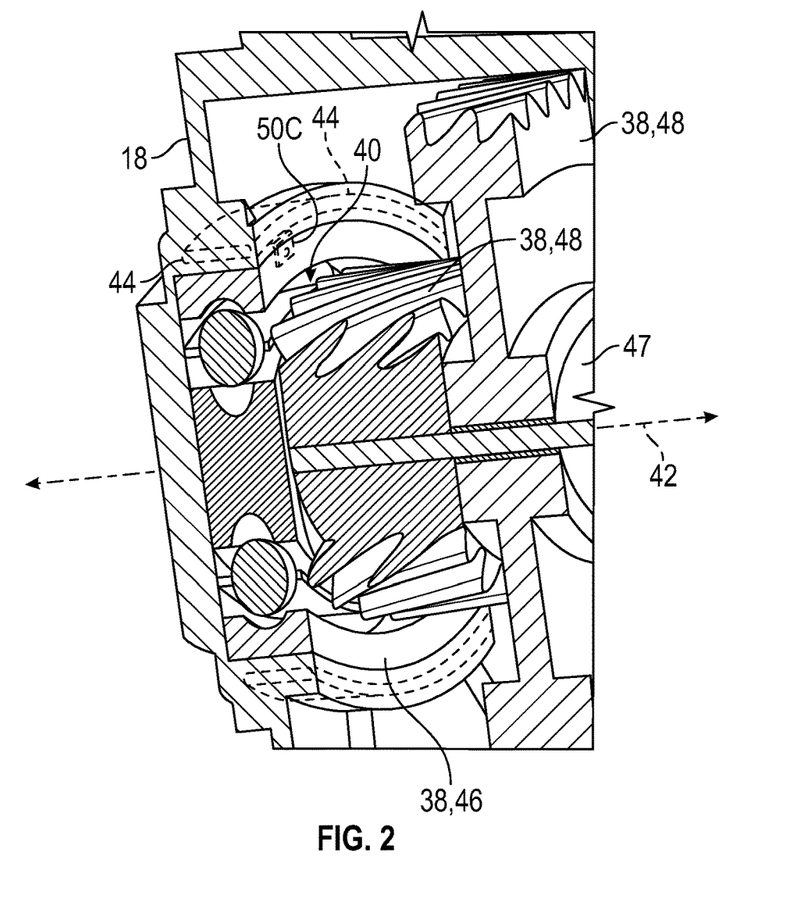
FIG. 2 is a schematic fragmentary cross-sectional view of a transmission, as one example, utilizing the noise vibration harshness reduction assembly.
Figure 9:
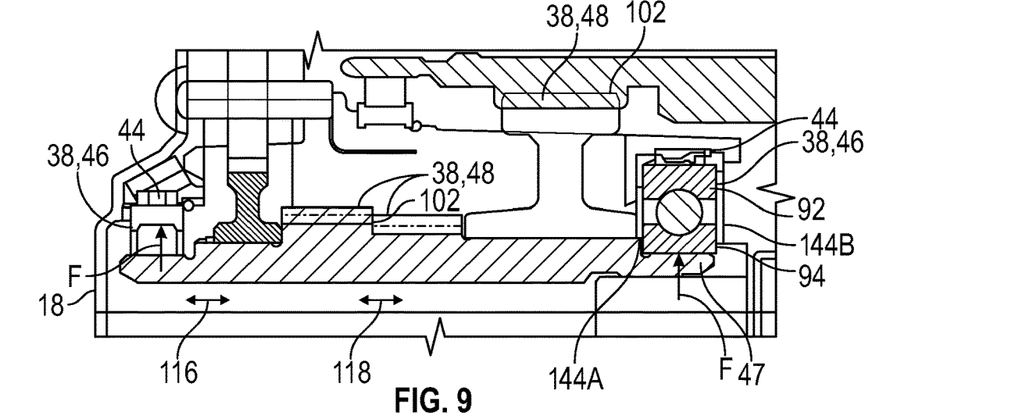
FIG. 9 is a schematic fragmentary cross-sectional view of the radial ring and the axial rings relative to a bearing.

Referring to FIGS. 2 and 9, the noise vibration harshness reduction assembly 10 includes the housing 18 and a component 38 supported via the housing 18. The housing 18 may contain various moving parts, some of which may be the component 38. For example, the housing 18 may contain the moving parts (including the component 38) of the prime mover 14, the transmission 16, the differential, etc. As such, the housing 18 may be a transmission casing, an engine casing, an electric machine casing, a differential casing, etc. In certain configurations, as best shown in FIG. 1, the housing 18 may define a hole 40 along a central axis 42. Depending on the location of the hole 40 and the type of the housing 18, the output shaft 20, the input member 22, or the output member 28, etc., may be disposed through the hole 40.

The component 38 is movable relative to the housing 18. In certain configurations, the component 38 is rotatable about the central axis 42. Furthermore, in certain configurations, the component 38 is rotatable about the central axis 42 that creates a high-load area (see FIGS. 12 and 13) on the component 38. For example, torque Ts (see FIG. 11) may be created via rotation of the component 38, and this torque Ts creates the high-load area which produce vibrations, and ultimately the sound that the ring is designed to counter. That is, operation of the component 38 produces or generates vibrations that create the sound, such as the noise, that may be heard outside the housing 18. It is desirable to attenuate this sound. The component 38 may be various configurations, and non-limiting examples of the component 38 may include one or more bearing(s) 46, shaft(s) 47 including the output shaft 20, gear(s) 48, member(s) including the input member 22 and the output member 28, etc. It is to be appreciated that the component 38 may include one or more of the moving parts.

Figure 5:
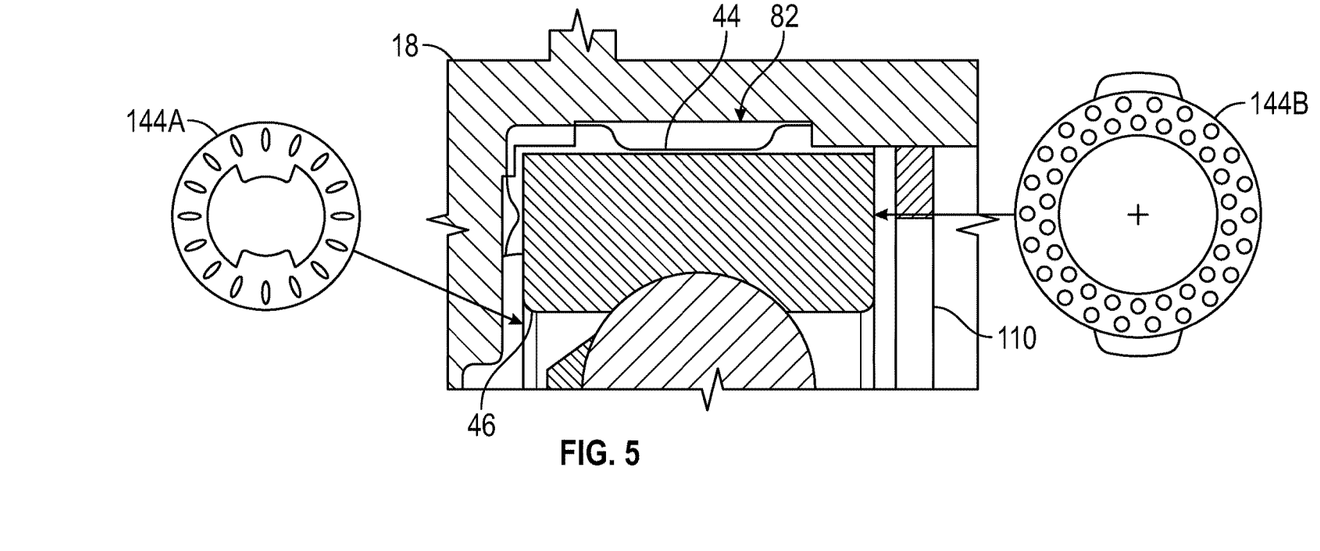
FIG. 5 is a schematic fragmentary cross-sectional view of the noise vibration harshness reduction assembly.

As best shown in FIG. 5 an axial ring 144 may be disposed adjacent to or between certain parts to attenuate the sound in response to operation of the moving parts, and thus, reduce the noise heard outside the housing 18. Therefore, the noise vibration harshness reduction assembly 10 includes the axial ring 144 disposed axially along the component 38. Generally, the axial ring 144 is configured to attenuate axial sound inducing vibrations in response to operation of the component 38. As such, movement of the component 38 may produce or generate vibrations that create one or more frequencies that radiate through the housing 18, and the axial ring 144 is designed to counter one or more of these frequencies to attenuate sound that radiates outside of the housing 18. Hence, the axial ring 144 may be used to create the impedance mismatch.

Figure 3:
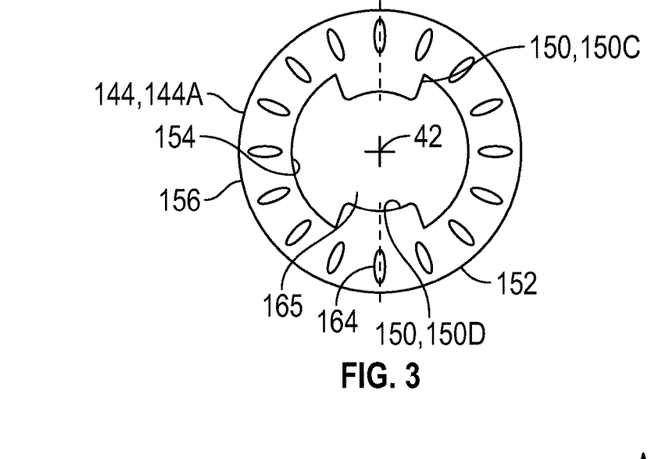
FIG. 3 is a schematic planar view of an axial ring.
Figure 4:
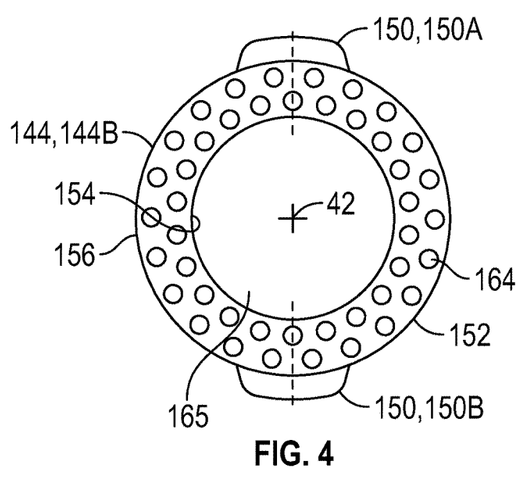
FIG. 4 is a schematic planar view of another axial ring.

As best shown in FIGS. 3 and 4, the axial ring 144 may be continuous. That is, the axial ring 144 continuously surrounds the central axis 42. In other words, the axial ring 144 completely surrounds the central axis 42. As such, the axial ring 144 is continuous to form an inner aperture 165 that is completely surrounded via the axial ring 144. Generally, the axial ring 144 prevents transmission of the sound axially out of the axial ring 144. Therefore, the sound that radiates axially from movement of the component 38 will be attenuated via the axial ring 144 due to the axial ring 144 being axially to the component 38. By forming the axial ring 144 as continuous, there are no spaces, gaps, etc. to allow the sound to exit the axial ring 144 axially.

The axial ring 144 may be in various locations relative to the component 38. In certain configurations, the axial ring 144 is disposed axially between the component 38 and the housing 18 relative to the central axis 42. For example, the axial ring 144 is piloted to the housing 18 to fix the axial ring 144 to the housing 18. In other configurations, the axial ring 144 is disposed axially along the component 38. For example, the axial ring 144 is piloted to the component 38 to fix the axial ring 144 to the component 38.

The axial ring 144 includes an axial body 152 that extends outwardly to a first axial distal edge 154 and a second axial distal edge 156 that oppose each other. The first axial distal edge 154 is spaced from the second axial distal edge 156 radially relative to the central axis 42. The first axial distal edge 154 faces inwardly toward the central axis 42, and the second axial distal edge 156 faces outwardly away from the central axis 42.

In various embodiments, the axial body 152 may be continuous. That is, the axial body 152 may be continuous such that the axial body 152 completely surrounds the central axis 42. Therefore, the axial body 152 of the axial ring 144 is continuous to form the inner aperture that is completely surrounded via the axial body 152. Generally, the axial body 152 prevents transmission of the sound axially out of the axial ring 144. That is, the axial body 152 is configured to attenuate axial sound inducing vibrations in response to operation of the component 38. Therefore, the sound that radiates axially from movement of the component 38 will be attenuated via the axial body 152 due to the axial ring 144 being axially aligned to the component 38. By forming the axial body 152 as continuous, there are no spaces, gaps, etc. to allow the sound to exit the axial ring 144 axially. In some embodiments, the axial body 152 may be discontinuous. That is, the axial body 152 may include partial and/or complete radial gaps around the central axis 42.

Optionally, the axial ring 144 may include other features to pilot the axial ring 144. For example, the axial ring 144 may include an axial flange 150 that protrudes away from one of the first axial distal edge 154 and/or the second axial distal edge 156. In certain configurations, the axial flange 150 is piloted to the housing 18 to fix the axial ring 144 to the housing 18. In other configurations, the axial flange 150 is piloted to the component 38 to fix the axial ring 144 to the component 38.

Figure 7:
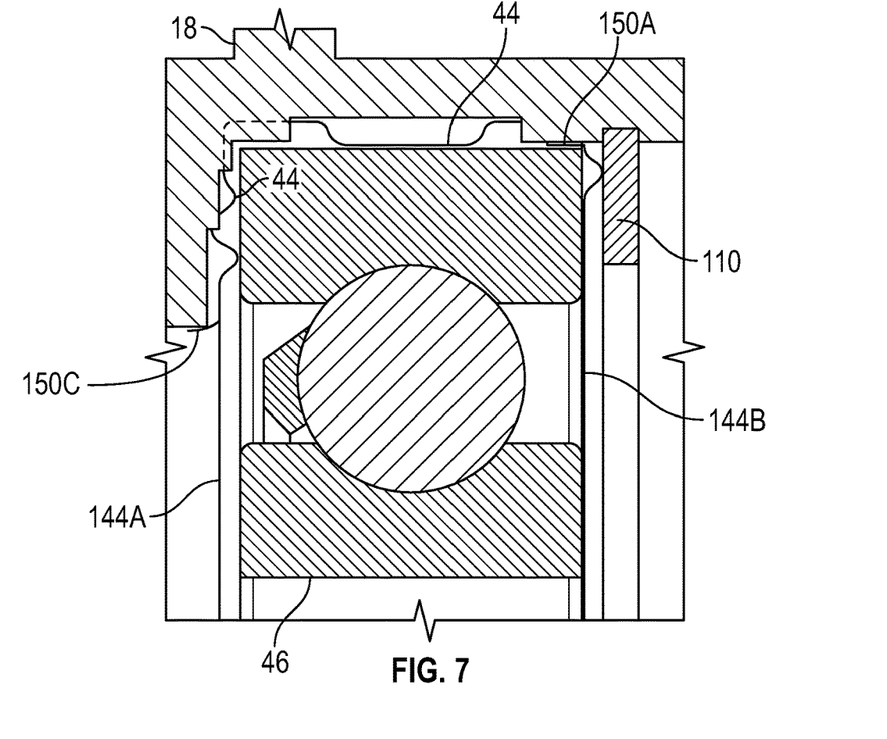
FIG. 7 is a schematic fragmentary cross-sectional view of the noise vibration harshness reduction assembly with a single radial ring and two axial rings.

In certain configurations, more than one axial flange 150 may be used. Therefore, optionally, the axial flange 150 may further include a plurality of axial flanges 150A-150B and 150C-150D spaced from each other. In certain configurations, each of the axial flanges 150C-150D may extend from the first axial distal edge 154 inwardly toward the central axis 42. In other configurations, each of the axial flanges 150A-150B may extend from the second axial distal edge 156 away from the axial body 152. In some embodiments (see FIGS. 4 and 5), the axial flanges 150A-150B may extend outwardly away from the central axis 42 within the same plane as the axial body 152. In other embodiments (see FIGS. 7 and 10), the axial flanges 150A-150D may extend at a right angle away from the plane of the axial body 152 and connect to the bearing 46 or the housing 18.

In various configurations, the axial body 152 of the axial ring 144 may include a plurality of axial corrugations 164. For example, the axial corrugations 164 of the axial body 152 may be disposed between the first axial distal edge 154 and the second axial distal edge 156. The axial corrugations 164 protrude outwardly and/or inwardly relative to the axial body 152. Furthermore, the axial corrugations 164 are closed. That is, the axial corrugations 164 are characterized by the absence of holes, apertures, etc., to prevent the sound from escaping through the axial ring 144 via such holes, apertures, etc. The axial corrugations 164 may have a suitable configuration, and non-limiting examples may include circular, square, oval, rectangular, overall, cross, elongated, etc., and combinations thereof. Furthermore, the axial corrugations 164 may have a suitable pattern or location along the axial body 152.

Figure 6:
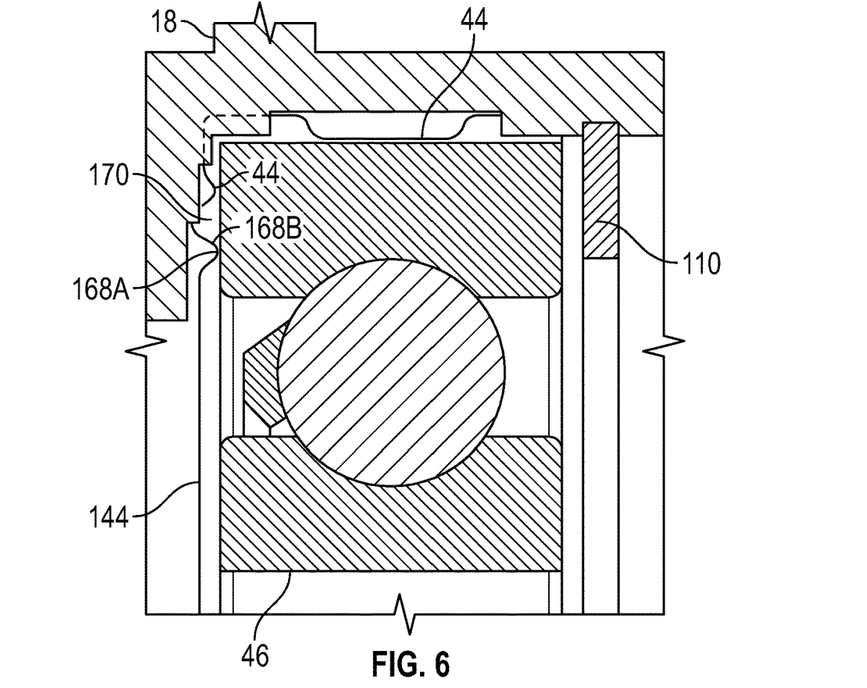
FIG. 6 is a schematic fragmentary cross-sectional view of the noise vibration harshness reduction assembly with a single radial ring and a single axial ring.

Furthermore, the axial corrugations 164 may overlap part of the component 38. As best shown in FIGS. 3, 4 and 6, a first side 168A of the axial corrugations 164 may abut the housing 18 or the component 38, and a second side 168B of the axial corrugations 164 may be spaced from the other one of the housing 18 or the component 38. For example, in one configuration as shown in FIG. 6, the first side 168A of the axial corrugations 164 abuts the component 38 and the second side 168B of the axial corrugations 164 are spaced from the housing 18 to present an axial pocket 170. Furthermore, the axial corrugations 164 allow the axial body 152 to be elastically compressed when one or more forces are applied to the axial body 152 in response to operation of the component 38. The axial corrugations 164 are configured in a desired configuration and desired spacing apart from each other to present the axial body 152 having desired stiffness characteristics that are discussed further below. The axial corrugations 164 along the axial body 152 may also function to control the location of the axial ring 144 relative to the housing 18 with acceptable positional tolerance.

In certain configurations, as mentioned above, the component 38 may include the bearing 46 disposed in the hole 40. For example, the bearing 46 may be used to reduce friction between the shaft 47 (which may include the output shaft 20, the input member 22 or the output member 28, etc.) that rotates and a stationary component 38, such as the housing 18. Furthermore, the bearing 46 may support the shaft 47 that rotates. The axial ring 144 may be disposed axially along the bearing 46 relative to the central axis 42. Therefore, due to the location of the axial ring 144 being axially along the bearing 46, the axial ring 144 attenuates the sound that travels axially from the bearing 46 out toward the housing 18.

Figure 8:
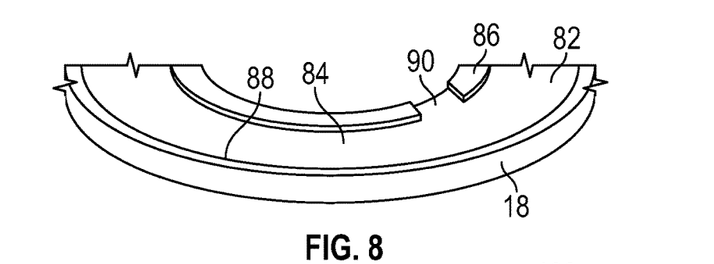
FIG. 8 is a schematic fragmentary perspective side view of a housing defining a recess and a path.
Figure 10:
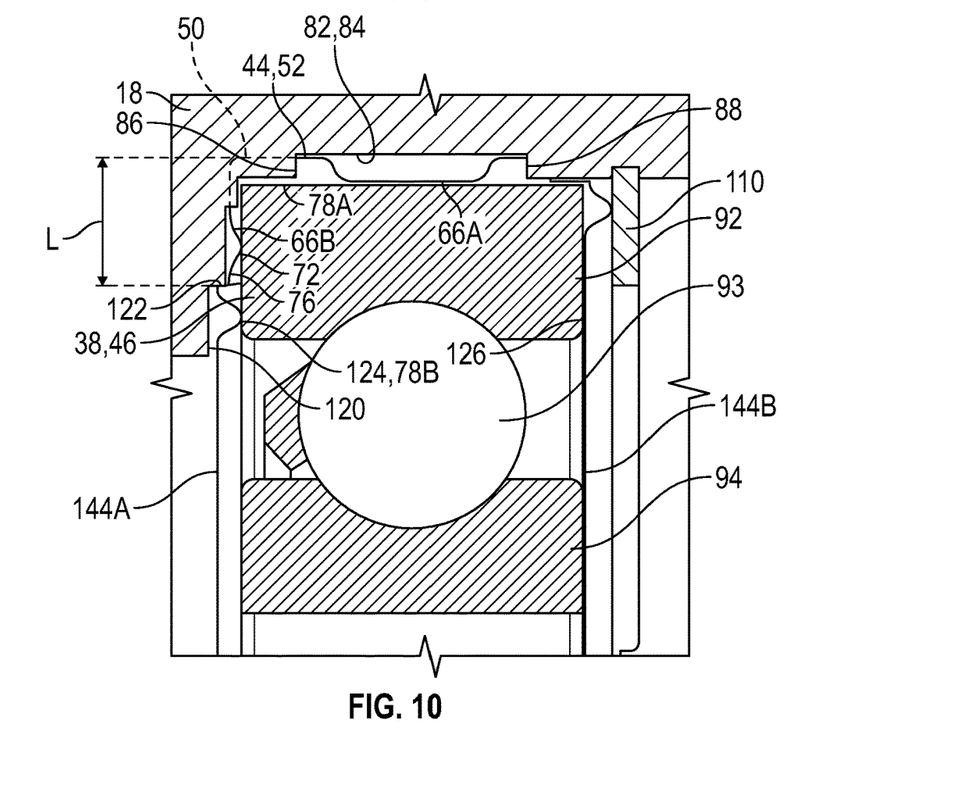
FIG. 10 is a schematic fragmentary cross-sectional view of the radial ring and the axial rings disposed between a housing and the bearing.

As best shown in FIGS. 8 and 10, the housing 18 may define a recess 82 that connects to the hole 40 such that the recess 82 is open to the hole 40 (see FIG. 2) and faces the central axis 42. The radial body 52 of the radial ring 44 may be disposed in the recess 82, and the radial side 78A of the component 38 faces the recess 82. As such, the housing 18 may present a back wall 84, a first shoulder 86 and a second shoulder 88 spaced from each other to surround the recess 82 along three-sides (see FIG. 6). The first radial distal edge of the radial body 52 may face the first shoulder 86 and the second radial distal edge of the radial body 52 may face the second shoulder 88.

Furthermore, the housing 18 may define a path 90 (see FIG. 8) that connects to the recess 82, and a radial flange 50 is disposed in the path 90 to fix the position of the radial body 52 of the radial ring 44 relative to the housing 18 and the bearing 46, such as a first race 92 of the bearing 46 in certain configurations. More specifically, the path 90 may be defined through the first shoulder 86 of the housing 18. In certain configurations, the path 90 may extend axially relative to the central axis 42, and the radial flange 50 may extend axially relative to one of the first radial distal edge and the second radial distal edge into the path 90. In other configurations, the path 90 may extend radially relative to the central axis 42, and the radial flange 50 may extend transversely relative to one of the first radial distal edge and the second radial distal edge into the path 90. In yet other configurations, the path 90 may extend both axially and radially (see FIG. 10) relative to the central axis 42, and the radial flange 50 extends both axially and radially from one of the first radial distal edge and the second radial distal edge into the path 90. The housing 18 may be configured as discussed above with the suitable number of paths 90 depending on the number of radial flanges 50 (e.g., 50A to 50C) being used. It is to be appreciated that if the plurality of radial flanges 50 are being used, the housing 18 may define a plurality of paths 90, and each of the paths 90 may be in the configurations discussed above for the path 90.

In certain configurations, as mentioned above, the component 38 may include the bearing 46 disposed in the hole 40 (see FIGS. 2 and 9). More specifically, the radial side 78A of the bearing 46 may face the recess 82. For example, the bearing 46 may be used to reduce friction between the shaft 47 (which may include the output shaft 20, the input member 22 or the output member 28, etc.) that rotates and a stationary component 38, such as the housing 18. Furthermore, the bearing 46 may support the shaft 47 that rotates. The radial ring 44 is disposed radially between the bearing 46 and the housing 18 relative to the central axis 42. Therefore, due to the location of the radial ring 44 being radially between the bearing 46 and the housing 18, the radial ring 44 attenuates the sound that travels radially from the bearing 46 out toward the housing 18.

Continuing with FIG. 10, the bearing may include the first race 92 fixed to the housing 18 and the second race 94 that is rotatable relative to the first race 92 about the central axis 42. One or more ball bearings are 93 disposed between the first and second races 92, 94. The second race 94 may be disposed closer to the central axis 42 than the first race 92 is relative to the central axis 42. Generally, the radial body 52 of the radial ring 44 may be disposed adjacent to the first race 92. For example, the radial body 52 is disposed axially along the first race 92 relative to the central axis 42. Therefore, the radial body 52 of the radial ring 44 may abut the first race 92. When utilizing the radial flange 50, the radial flange 50 is bent around the first race 92 or the radial flange 50 extends axially from the radial body 52 (i.e., not bent transverse to the radial body 52).

The radial body 52 includes a length L between the first axial distal edge 154 and the second axial distal edge 156. The length L of the radial body 52 overlaps the first race 92 axially. That is, the radial body 52 extends outwardly radially relative to the central axis 42 to overlap part of the component 38. Hence, the radial body 52 extends the length radially relative to the central axis 42 to overlap the first race 92 axially. It is to be appreciated that the length L of the radial body 52 may be longer or shorter than illustrated. It is to also be appreciated that the length L of the radial body 52 does not extend beyond the first race 92 relative to the second race 94. That is, the length L of the radial body 52 does not extend to the rotating part of the bearing 46, i.e., does not extend to the second race 94. The bearing 46 may be a ball-bearing, a cylindrical bearing, a roller bearing, or other suitable bearing that uses races.

Referring to FIG. 10, the first race 92 of the bearing 46 may include a radial side 78A that faces away from the central axis 42 and an axial side 78B disposed transverse to the radial side 78A such that the radial side 78A and the axial side 78B are adjacent to each other. Furthermore, the housing 18 may include an axial shoulder 122 that extends along the radial side 78A of the bearing 46 and extends along the axial side 78B of the bearing 46. In addition, the housing 18 may include an axial wall 120 that faces the axial side 78B of the bearing 46.

In certain configurations, the axial ring 144 engages the axial shoulder 122 when a high (or first) load 116 is applied axially to the bearing 46. A high load 116 may be a force greater than several thousand (e.g., >5,000) newtons. In other configurations, the axial corrugations 164 engage the axial side 78B of the bearing 46 and the axial wall 120 of the housing 18 to stabilize the bearing 46 when a low (or second) load 118 is applied axially to the bearing 46. A low load 118 may be a force less than the several thousand (e.g., <5,000) newtons. Other thresholds for the high load 116 and the low load 118 may be implemented to meet the criteria of a particular application.

Optionally, the axial ring 144 may be used in more than one location. The axial side 78B of the first race 92 may be referred to as a first axial side 124. The first race 92 of the bearing 46 may include the radial side 78A as discussed above. The first axial side 124 disposed transverse to the radial side 78A, and a second axial side 126 opposing the first axial side 124 and disposed transverse to the radial side 78A. As such, in this configuration, the axial wall 120 of the housing 18 faces the first axial side 124 of the bearing 46. In one configuration, the axial ring 144 abuts the first axial side 124 of the first race 92. In another configuration, the axial ring 144 abuts the second axial side 126 of the first race 92.

In yet another configuration, more than one axial ring 144 may be used. Therefore, optionally, the axial ring 144 is further defined as a first axial ring 144A and further including a second axial ring 144B spaced axially from the first axial ring 144A. Therefore, in this configuration, the bearing 46 may be disposed between the first axial ring 144A and the second axial ring 144B. For example, the first axial ring 144A may be disposed axially between the first axial side 124 of the first race 92 and the axial wall 120 of the housing 18 relative to the central axis 42, and the second axial ring 144B may be disposed axially along the second axial side 126 of the first race 92 relative to the central axis 42.

Optionally, a snap ring 110 (also see FIGS. 5, 7 and 10) may be used to secure the axial ring 144 to the bearing 46 or the housing 18. For example, the snap ring 110 may engage the axial ring 144 and the housing 18 to retain the axial ring 144 relative to the component 38. More specifically, the snap ring 110 may engage the axial ring 144 (e.g., 144A) and the axial wall 120 of the housing 18. When the axial ring 144 is disposed along the second axial side 126 of the bearing 46, the snap ring 110 may engage the axial ring 144 (e.g., 144B in FIGS. 7 and 10) and a pocket in the housing 18 and/or the second axial side 126 of the bearing 46 to retain the axial ring 144 relative to the component 38. In various embodiments, the snap ring 110 and an axial ring 144 may be integrated into a single component. It is to be appreciated that more than one snap ring 110 may be used if using more than one axial ring 144.

Figure 12:
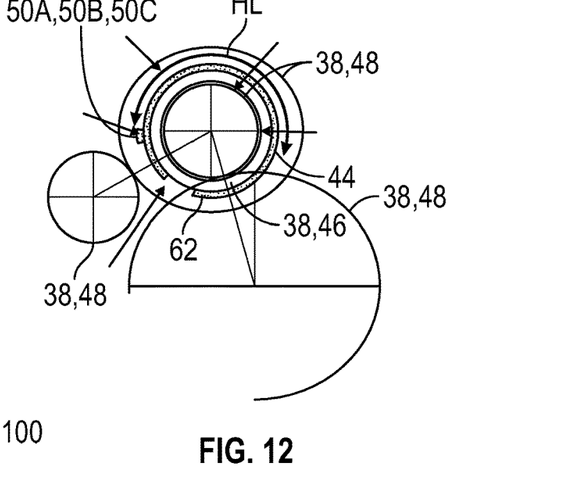
FIG. 12 is a schematic illustration of a high-load area relative to the radial ring.

As discussed above, the component 38 may include the shaft 47, and the bearing 46 supports rotation of the shaft 47. Therefore, for example, rotation of the shaft 47 (which may include the output shaft 20, the input member 22 or the output member 28, etc.) creates the high-load area HL, $HL_1$, $HL_2$ on the bearing 46. That is, torque Ts produced due to rotation of the shaft 47 creates the high-load area HL, $HL_1$, $HL_2$ that is transferred to the bearing 46. The first shoulder 86 and the second shoulder 88 of the housing 18 support higher torques, such as torque Ts, produced via rotation of the shaft 47. Referring to FIG. 12, in certain configurations, one high-load area HL is created on the bearing 46. The body 52 of the radial ring 44 is positioned along the high-load area HL, $HL_1$, $HL_2$ to maximize attenuation of the sound in response to operation of the shaft 47. Therefore, the opening 62 of the radial ring 44 is spaced from the high-load area HL, $HL_1$, $HL_2$. That is, the opening 62 of the radial ring 44 does not attenuate the sound so it is desirable to position the opening 62 away from the high-load area HL, $HL_1$, $HL_2$ which produces or generates the sound to be attenuated. Generally, the high-load area HL, $HL_1$, $HL_2$ may create a force F equal to or greater than 5 kilonewton (kN). More specifically, as one non-limiting example, the force F created in the high-load area HL, $HL_1$, $HL_2$ may be about 5 kN to about 30 kN.

The radial ring 44 may be tuned to a desired frequency to attenuate the sound produced along the high-load area HL, $HL_1$, $HL_2$. For example, the radial ring 44 may be formed with a stiffness Ks (see FIG. 11) that is designed to attenuate the sound along the high-load area HL, $HL_1$, $HL_2$. Generally, the stiffness Ks of the radial ring 44 is the extent to which the body 52 of the radial ring 44 resists deformation in response to the force F from the high-load area HL, $HL_1$, $HL_2$ being applied thereto. Therefore, the stiffer the body 52 of the radial ring 44 is the less the body 52 will deform in response to the force, and vice versa. As such, the body 52 will vibrate at different rates depending on the stiffness Ks, and thus, the frequency of the radial ring 44 may be tuned to the desired frequency to attenuate the sound produced during operation of the component 38. Hence, the frequency of the radial ring 44 cancels the frequency of the component 38 to attenuate the sound that radiates out of the housing 18. Generally, reducing the stiffness Ks radially and axially may assist in reducing the sound heard outside of the housing 18.

Optionally, the radial ring 44 may be designed to attenuate a plurality of frequencies of the sound. Therefore, the radial ring 44 may have different areas being of different stiffnesses $K_{s1}$, $K_{s2}$. For example, the body 52 of the radial ring 44 may include a first portion 98 that provides a first-ring stiffness $K_{s1}$ and a second portion 100 that provides a second-ring stiffness $K_{s2}$ different from the first-ring stiffness $K_{s1}$. For example, referring to FIG. 13, rotation of the shaft 47 creates a first-high-load area $HL_1$ on the bearing 46 when in a first condition and creates a second-high-load area $HL_2$ on the bearing 46 when in a second condition. The first-high-load area $HL_1$ is different from the second-high-load area $HL_2$. The first portion 98 of the body 52 that has the first-ring stiffness $K_{s1}$ aligns with the first-high-load area $HL_1$ to maximize attenuation of the sound in the first-high-load area $HL_1$ and the second portion 100 of the body 52 that has the second-ring stiffness $K_{s2}$ aligns with the second-high-load area $HL_2$ to maximize attenuation of the sound in the second-high-load area $HL_2$. It is to be appreciated that the radial ring 44 may be designed with a suitable number of portions 98, 100 having different stiffnesses 98, 100. It is to also be appreciated that the radial ring 44 may have the different stiffness portions 98, 100.

Figure 13:
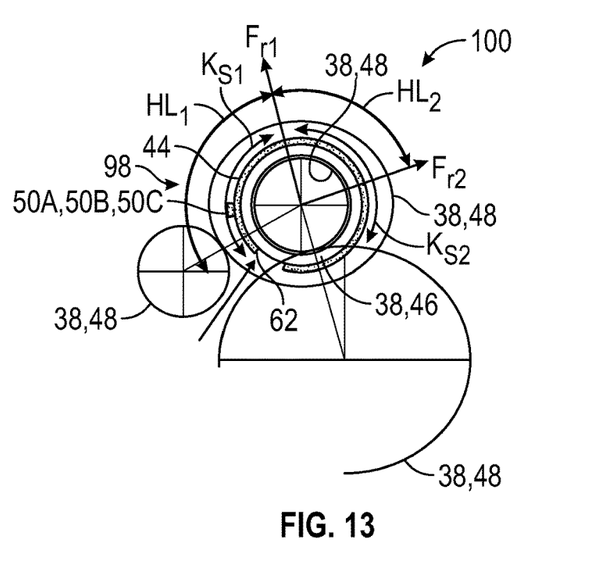
FIG. 13 is a schematic illustration of two high-load areas relative to the radial ring.

For example, referring to FIG. 13, if the radial ring 44 is being used in the transmission 16, a first resulting force $F_{r1}$ in a first direction is different from a second resulting force $F_{r2}$ in a second direction due to operation of the transmission 16 in the first condition and the second condition. The first resulting force $F_{r1}$ in the first direction creates the first-high-load area $HL_1$ that is different from the second resulting force $F_{r2}$ in the second direction. The first condition may be when the transmission 16 operates in a drive mode in which the movable platform 12 is being propelled, and the second condition may be when the transmission 16 operates in a regenerative braking mode in which energy is recovered during braking of the movable platform 12 that may be used immediately or stored in an energy storage device for later use. Changes in the load direction may allow for a new stiffness over the corresponding reaction arc, and thus, the radial ring 44 may be designed with the different stiffnesses $K_{s1}$, $K_{s2}$. Changing the output torque direction, such as drive to coast or regenerative braking, may change the load direction that allows for a new stiffness over the corresponding reaction arc. Also, if multiple prime movers 14 interact with the output shaft 20 (e.g., such as a hybrid vehicle where torque from the engine on one gear and torque from the electric motor also being transmitted through the same output shaft 20 by a different gear which may be at different uncorrelated levels of torque), then the radial ring 44 may be designed with different stiffnesses $K_{s1}$, $K_{s2}$.

The present disclosure also provides a method of utilizing the radial ring 44 to attenuate the sound in response to operation of the component 38 inside of the housing 18. Parameters of the radial ring 44 are determined and then the radial ring 44 is formed to those parameters. For example, the torque Ts is selected that is applied to the radial ring 44. The torque Ts is a given value based on the torque applied to the component 38. For example, the torque Ts from rotation of the shaft 47 is applied to the bearing 46 as the force F and ultimately as the force F to the radial ring 44.

Figure 11:
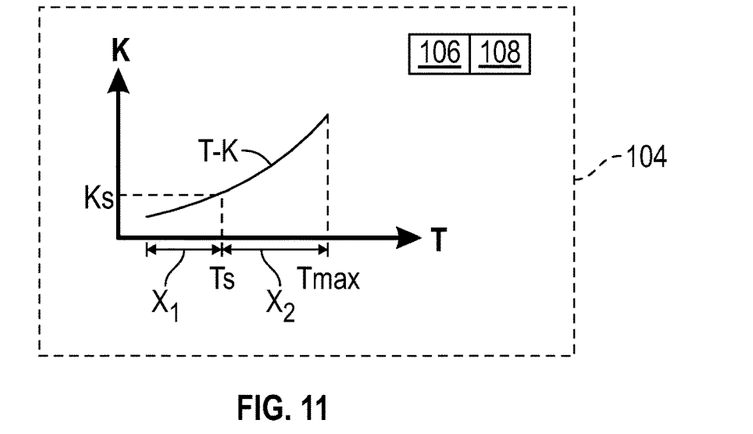
FIG. 11 is a schematic illustration of a controller that includes data regarding a torque-stiffness curve.

The stiffness Ks of the radial ring 44 is determined based on a torque-stiffness curve T-K (see FIG. 11) which utilizes the selected torque Ts to maximize attenuation of the sound in response to operation of the component 38. That is, to attenuate the sound, the radial ring 44 needs to be designed with the desired stiffness Ks. The graph of FIG. 11 illustrates the torque-stiffness curve T-K, where the y-axis provides the values for the stiffness K and the x-axis provides the values of the torque T. Therefore, the stiffness Ks of the radial ring 44 may be found by identifying the value of the torque Ts on the torque-stiffness curve T-K. At the intersection point on the torque-stiffness curve T-K, the value of the stiffness Ks is found. Continuing with the graph of FIG. 11, a first range $X_1$ of the torque T suitable for the radial ring 44 is at the selected torque Ts or below the selected torque Ts. Based on these values, the radial ring 44 is manufactured that meets the determined stiffness Ks.

The torque-stiffness curve T-K is developed via a system analysis to satisfy misalignment and deflection requirements of the radial ring 44. Satisfying the allowable limits of misalignment impacts gear tooth contact from deflection under load and clearances. The radial ring 44 may be designed utilizing a finite element method (FEM), which subdivides a large system into smaller simpler pieces that are the finite elements. For example, one or more simple equations are used to model the finite elements which are then assembled into a larger system of equations that are used to ultimately model the result for the torque-stiffness curve T-K, which may be referred to as finite element analysis (FEA).

The transmission 16 may include various gears 48 coupled to the shaft 47, and thus as discussed above, the component 38 may include the gears 48. The gears 48 may be used to change operation modes of the transmission 16 or the torque being outputted to the wheels 34 via changing a gear ratio of certain gears 48. A profile 102 of the gears 48 (see FIG. 9) may also be used to tune the radial ring 44 to desired stiffness Ks. The profile 102 of the component 38, here one or more gears 48, is/are manufactured at a second range $X_2$ of the torque T (see the graph of FIG. 11) that is higher than the selected torque Ts applied to the radial ring 44. Therefore, the profile 102 of the gear(s) 48 is designed to have a torque T above the torque Ts of the radial ring 44 and no greater than a maximum torque Tmax, i.e., within the second range $X_2$ (see the graph of FIG. 11). For example, to optimize the profile 102 of the gear(s) 48, system modeling and noise-vibration-harshness (NVH) modeling may be used. System modeling comprehends the gear 48 as a source and the response of the housing 18. NVH modeling may be used to study and modify sound characteristics, such as noise and vibration characteristics, of the component 38 during operation, such as movement or rotation of the component 38. For example, when the component 38 is the gear 48, the system modeling and the NVH modeling may be used to optimize the profile 102 of the gear 48 for the torque T with the bearing 46 supported via the housing 18.

Therefore, a controller 104 (see FIG. 11) may be utilized to perform the FEM, which includes the FEA, the system modeling, and the NVH modeling. Instructions may be stored in a memory 106 of the controller 104 and automatically executed via a processor 108 of the controller 104 to provide the respective control functionality and modeling functionality. The controller 104 is configured to execute the instructions from the memory 106, via the processor 108. For example, the controller 104 may be a host machine or distributed system, e.g., a computer such as a digital computer or microcomputer, and, as the memory 106, tangible, non-transitory computer-readable memory such as read-only memory (ROM) or flash memory. The controller 104 may also have random access memory (RAM), electrically erasable programmable read-only memory (EEPROM), a high-speed clock, analog-to-digital (A/D) and/or digital-to-analog (D/A) circuitry, and appropriate input/output circuitry and associated devices, as well as appropriate signal conditioning and/or signal buffering circuitry. Therefore, the controller 104 may include all software, hardware, memory 106, algorithms, connections, sensors, etc., necessary to control, formulate, and/or models, for example, the data for the radial ring 44 and the component 38. As such, a control method to formulate the design of the radial ring 44 and the component 38, may be embodied as software or firmware associated with the controller 104. Optionally, more than one controller 104 may be utilized.

The radial ring 44 may be manufactured with one or more of the features discussed above, such as the corrugations, and will not be repeated. After the radial ring 44 is manufactured with the desired stiffness Ks and orientation of the flange 50A, 50B, 50C, the radial ring 44 is disposed radially between the component 38 and the housing 18 to attenuate the sound in response to operation of the component 38. For example, in certain configurations, the body 52 may be disposed in the recess 82 of the housing 18 before placing the bearing 46 relative to the housing 18. The radial ring 44 may be compressed or squeezed due to the non-continuous configuration of the body 52, which shrinks the outer diameter of the radial ring 44 and allows the radial ring 44 to be inserted into the hole 40 of the housing 18 and align with the recess 82. The flange 50A, 50B, 50C of the radial ring 44 is disposed in the path 90 of the housing 18 and once the body 52 is aligned with the recess 82, the radial ring 44 is released to seat the body 52 within the recess 82 and at least partially un-compress the radial ring 44. After the radial ring 44 is positioned in the recess 82 of the housing 18, the component 38, such as the bearing 46, may be press fit to the housing 18 within the hole 40 of the housing 18 until the desired compression load is applied to the radial ring 44.

Figure 14:
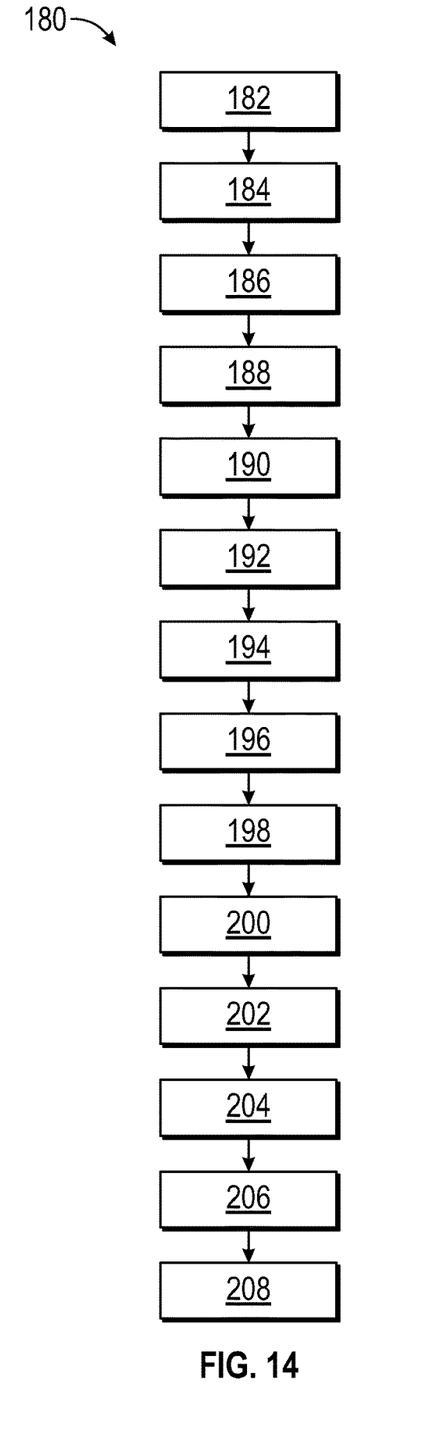
FIG. 14 is a flow diagram of a method for utilizing the noise vibration harshness reduction assembly.

Referring to FIG. 14, a flow diagram of an example method 180 for utilizing the noise vibration harshness reduction assembly 10 is shown. The method 180 utilizes an axial ring 144 and a radial ring 44 to attenuate axial and radial sound inducing vibrations in response to operation of a component 38 inside of a housing 18. The axial ring 144 is disposed transverse to the radial ring 44 along the component 38.

Specifications for the noise vibration harshness reduction assembly 10 are provided in a step 182. Parameters of the radial ring 44 are determined in a step 184 and then the radial ring 44 is formed to those parameters. For example, the torque Ts is selected that is applied to the radial ring 44 in a step 186. The torque Ts is a given value based on the torque applied to the component 38. For example, the torque Ts from rotation of the shaft 47 is applied to the bearing 46 as the force F and ultimately as the force F to the radial ring 44.

A stiffness of the radial ring 44 is determined in the step 188 based on a stiffness-torque curve utilizing the selected torque to attenuation radial sound in response to operation of the component 38. A stiffness of the axial ring 144 is determined in a step 190 based on an axial load and selected torque of the radial ring 44. In a step 192, the radial ring 44 is manufactured that meets the determined stiffness of the radial ring 44. In a step 194, the axial ring 144 is manufactured that meets the determined stiffness of the axial ring 144. In a step 196, the profile 102 of the component 38 is manufactured at a torque range higher than the selected torque applied to the radial ring 44. The housing 18 is manufactured in the step 198.

The axial ring 144 (e.g., the first axial ring 144A) is disposed axially along the component 38 in a step 200 to attenuate axial sound in response to operation of the component 38. In a step 202, the radial ring 44 is disposed radially on the component 38. Afterwards, the bearing 46, with the radial ring 44 attached, are disposed axially along the component 38 in a step 204. Another axial ring 144 (e.g., the second axial ring 144B) is disposed axially along the component 38 in a step 206 to aid in attenuating the axial sound in response to operation of the component 38. In a step 208, the snap ring 110 is disposed axially along the component 38 and coupled to the housing 18.

It is to be appreciated that the order or sequence of performing the method is for illustrative purposes and other orders or sequences are within the scope of the present teachings.

While the best modes and other configurations for carrying out the disclosure have been described in detail, those familiar with the art to which this disclosure relates will recognize various alternative designs and configurations for practicing the disclosure within the scope of the appended claims. Furthermore, the configurations shown in the drawings or the characteristics of various configurations mentioned in the present description are not necessarily to be understood as configurations independent of each other. Rather, it is possible that each of the characteristics described in one of the examples of a configuration can be combined with one or a plurality of other desired characteristics from other configurations, resulting in other configurations not described in words or by reference to the drawings. Accordingly, such other configurations fall within the framework of the scope of the appended claims.

What is claimed is:

1. A noise vibration harshness reduction assembly comprising:
   a housing that defines a hole along a central axis;
   a component supported via the housing and movable relative to the housing, wherein:
      the component includes a bearing disposed in the hole;
      the bearing includes a first race fixed to the housing and a second race rotatable relative to the first race about the central axis;
      the first race of the bearing includes a radial side that faces away from the central axis and an axial side disposed transverse to the radial side such that the radial side and the axial side are adjacent to each other;
      the housing includes a shoulder that extends along the radial side of the bearing and extends along the axial side of the bearing; and
      the housing includes an axial wall that faces the axial side of the bearing; and
   an axial ring disposed axially along the bearing of the component relative to the central axis, and wherein:
      the axial ring includes an axial body disposed axially along the first race relative to the central axis;
      the axial body of the axial ring includes a plurality of axial corrugations; and
      the axial corrugations engage the axial side of the bearing and the axial wall of the housing to stabilize the bearing when a low load is applied axially to the bearing; and
      the axial ring is configured to attenuate axial sound inducing vibrations in response to operation of the component.

2. The noise vibration harshness reduction assembly as set forth in claim 1 wherein the component is rotatable about the central axis, and the axial ring continuously surrounds the central axis.

3. The noise vibration harshness reduction assembly as set forth in claim 1 wherein the axial ring is disposed axially between the component and the housing relative to the central axis.

4. The noise vibration harshness reduction assembly as set forth in claim 1 wherein:
the axial body extends outwardly to a first axial distal edge and a second axial distal edge that oppose each other;
the first axial distal edge is spaced from the second axial distal edge radially relative to the central axis; and
the first axial distal edge faces inwardly toward the central axis, and the second axial distal edge faces outwardly away from the central axis.

5. The noise vibration harshness reduction assembly as set forth in claim 4 wherein the axial ring includes an axial flange that protrudes outwardly from one of the first axial distal edge and the second axial distal edge.

6. The noise vibration harshness reduction assembly as set forth in claim 5 wherein the axial flange is piloted to the housing to fix the axial ring to the housing.

7. The noise vibration harshness reduction assembly as set forth in claim 5 wherein the axial flange is piloted to the component to fix the axial ring to the component.

8. The noise vibration harshness reduction assembly as set forth in claim 5 wherein the axial flange further includes a plurality of axial flanges spaced from each other, and wherein each of the axial flanges extend from the first axial distal edge inwardly toward the central axis.

9. The noise vibration harshness reduction assembly as set forth in claim 5 wherein the axial flange further includes a plurality of axial flanges spaced from each other, and wherein each of the axial flanges extend from the second axial distal edge away from the axial body.

10. The noise vibration harshness reduction assembly as set forth in claim 4 wherein the axial body of the axial ring includes a plurality of axial corrugations disposed between the first axial distal edge and the second axial distal edge.

11. The noise vibration harshness reduction assembly as set forth in claim 1 wherein:
the axial body surrounds the central axis; and
the axial body extends outwardly radially relative to the central axis to overlap part of the component.

12. The noise vibration harshness reduction assembly as set forth in claim 1 wherein the axial body of the axial ring includes a plurality of axial corrugations that overlap part of the component.

13. The noise vibration harshness reduction assembly as set forth in claim 1 wherein:
the axial ring engages the shoulder when a high load is applied axially to the bearing.

14. The noise vibration harshness reduction assembly as set forth in claim 1:
wherein the radial side of the first race defines a first axial side disposed transverse to the radial side, and a second axial side opposing the first axial side and disposed transverse to the radial side;
wherein the axial wall faces the first axial side of the bearing;
wherein the axial ring is further defined as a first axial ring disposed axially between the first axial side of the first race and the axial wall of the housing relative to the central axis; and
further including a second axial ring disposed axially along the second axial side of the first race relative to the central axis.

15. The noise vibration harshness reduction assembly as set forth in claim 1 further including a snap ring engaging the axial ring and the housing to retain the axial ring relative to the component.

16. A method of utilizing an axial ring and a radial ring to attenuate axial and radial sound inducing vibrations in response to operation of a component inside of a housing, wherein the axial ring is disposed transverse to the radially ring along the component, the method comprising:
selecting a torque applied to the radial ring;
determining a stiffness of the radial ring based on a stiffness-torque curve utilizing the selected torque to attenuate radial sound in response to operation of the component;
determining a stiffness of the axial ring based on an axial load and the selected torque of the radial ring;
manufacturing the radial ring that meets the determined stiffness of the radial ring;
manufacturing the axial ring that meets the determined stiffness of the axial ring;
manufacturing a profile of the component at a torque range higher than the selected torque applied to the radial ring; and
disposing the axial ring axially along the component to attenuate axial sound in response to operation of the component.

17. The method as set forth in claim 16 wherein:
the housing defines a hole along a central axis;
the component includes a bearing disposed in the hole; and
the axial ring is disposed axially along the bearing relative to the central axis.

18. The method as set forth in claim 17 wherein:
the bearing includes a first race fixed to the housing and a second race rotatable relative to the first race about the central axis; and
the axial ring includes an axial body disposed axially along the first race relative to the central axis.

19. The method as set forth in claim 18, wherein:
the first race of the bearing includes a radial side that faces away from the central axis and an axial side disposed transverse to the radial side such that the radial side and the axial side are adjacent to each other;
the housing includes a shoulder that extends along the radial side of the bearing and extends along the axial side of the bearing; and
the axial ring engages the shoulder when a high load is applied axially to the bearing.

20. The method as set forth in claim 18, wherein:
the first race of the bearing includes a radial side that faces away from the central axis and an axial side disposed transverse to the radial side such that the radial side and the axial side are adjacent to each other;
the housing includes a shoulder that extends along the radial side of the bearing and extends along the axial side of the bearing;
the housing includes an axial wall that faces the axial side of the bearing;
the axial body of the axial ring includes a plurality of axial corrugations; and
the axial corrugations engage the axial side of the bearing and the axial wall of the housing to stabilize the bearing when a low load is applied axially to the bearing.

* * * * *